United States Patent Office 3,274,174
Patented Sept. 20, 1966

3,274,174
N-1,1-DIHYDROFLUOROALKYL-N'-
ALKYLENE UREA
Heinz Enders, Stadtbergen, near Augsburg, and Hans Karl Wiest, Gersthofen, near Augsburg, Germany, assignors to Chemische Fabrik Pfersee G.m.b.H., Augsburg, Germany, a firm of Germany
No Drawing. Filed Feb. 1, 1963, Ser. No. 255,690
Claims priority, application Germany, Feb. 14, 1962, C 26,226
6 Claims. (Cl. 260—239)

The present invention relates to new and useful fluorinated ureas and the method of making such ureas. In one aspect the invention relates to new polymers obtained from the new ureas of this invention.

It has been found that new fluorine-containing compounds which are of industrial value can be prepared when isocyanates of the formula $X(CF_2)_nCH_2NCO$, in which $n$ is at least 3 and preferably not more than 10, and X is fluorine or hydrogen, are reacted with alkylenimines.

Although the reaction of the two components as such is possible, it expediently takes place in an organic solvent in order to be able to better regulate the temperature of the exothermic reaction. By this means and through slow addition, as well as through cooling, the temperature is maintained as low as possible, preferably at 5° to 10° C. At higher temperatures the reaction proceeds very turbulently with formation of dark-colored products. However, the reaction can also be undertaken in an aqueous phase, which, if necessary, may contain a small amount of an alkaline compound.

The two components, isocyanate and imine, are preferably used in a mol ratio of 1:1. A very small excess of alkylenimines is appropriate since their boiling points are usually low, and, therefore, even with cooling losses can occur. A large excess of alkylenimine raises the heat of reaction of polymerization and promotes the formation of polymeric compounds.

Suitable alkylenimines include ethylenimine and its lower homologs, such as propylene, butylene or pentylenimine, and the preferred alkylenimines may be represented by the formula

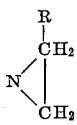

in which R is a lower alkyl radical. Polymeric alkylenimines can also in principle be reacted in the same manner; however, polymeric compounds are thereby formed.

The reaction takes place nearly quantitatively. If it is undertaken in an organic solvent, then vigorous cooling at temperatures below 0° C. precipitates considerable amounts of N-1,1-dihydrofluoroalkyl-N'-alkylene urea. Additional amounts in a pure form can be obtained from the mother liquor by careful evaporation of the solvent in vacuum.

If the above reaction product is heated slowly, an exothermic reaction again takes place at a temperature of about 100° C. with formation of polymeric compounds. If one wants to obtain such materials, then the temperature must be maintained below 140° to 150° C., since otherwise dark-colored, insoluble products are formed. Through cooling and careful evaporation of any solvent, the polymeric products can then be obtained.

The urea compounds obtained are insoluble in water, but are soluble in concentrated low molecular weight organic acids, and then remain in solution or in emulsion upon dilution with water. They are slightly soluble to insoluble in hydrocarbons and most of the chlorinated solvents, and are more soluble in lower aliphatic alcohols, ethers and ketones; but this organic solubility depends on the particular product.

When the urea compounds are present not in monomeric but in polymeric state, solubility becomes less with increasing degree of polymerization.

The monomeric and also the polymeric products obtained in conformance with this invention are suitable as fungicides, as well as foam-reducing agents in solutions of anionic substances. The urea compounds are also useful for treating textiles and leather for oil and water repellency. On heating, the formation of resins takes place. These resins, however, usually possess a brittle character.

Example 1

In the preparation of N-1,1-dihydroperfluorooctyl-N'-ethylene urea

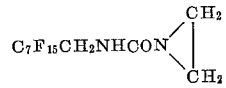

5.1 parts by weight of ethylenimine in 100 parts by volume methylethyl ketone are slowly added drop-wise with cooling and agitation at a temperature of 5° to 10° C. to a solution of 50 parts by weight of 1,1-dihydroperfluorooctyl isocyanate, which can be prepared, for example according to U.S. Patent No. 2,706,733, in 200 parts by volume of methylethyl ketone. It is then agitated for one-half hour at this temperature, and in so doing a small quantity of white crystals precipitate. By cooling vigorously to −40° C., the desired product is largely precipitated and filtered with suction. Additional product can be obtained by concentrating the mother liquor in a vacuum and cooling again so that the N-1,1-dihydroperfluorooctyl-N'-ethylene urea is obtained in nearly quantitative yield in a very pure form. Recrystallization from methylethyl ketone, at a temperature not above 20° C., yields a substance melting at 74° C. with a molecular weight of 468 and with the following analytical data:

$C_{11}H_7F_{15}N_2O$.—Calculated: 28.21% C, 1.51% H, 5.98% N. Found: 28.38% C, 1.64% H, 5.98% N.

The substance is insoluble in water, slightly soluble in n-butanol, diethyl ether, benzene, methylene chloride, carbon tetrachloride, tri- and perchloroethylene, and highly soluble in the lower aliphatic alcohols, acetone, methylethyl ketone, chloroform and glacial acetic acid. A corresponding reaction product from a non-fluorinated isocyanate is only turbidly soluble in glacial acetic acid.

Example 2

N-1,1-dihydroperfluorobutyl-N'-ethylene urea

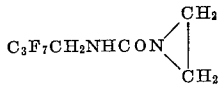

is obtained from a solution of 26 parts by weight of 1,1-dihydroperfluorobutyl isocyanate in 100 parts by volume of carbon tetrachloride and 5 parts by weight of ethylenimine dissolved in 50 parts by volume of carbon tetrachloride under conditions similar to those described in Example 1. The final solution does not need to be cooled so much in the work-up before the suction filtration because of the low solubility of the reaction product. The product precipitates in nearly quantitative yield. Recrystallization from diethyl ether yields an analytically pure product which melts at 64° C.

The analytical values for $C_7H_7F_7N_2O$.—Calculated: 31.36% C, 2.63% H, 10.45% N. Found: 31.49% C, 2.65% H, 10.91% N.

The compound is insoluble in water, slightly soluble in carbon tetrachloride, trichloroethylene and perchloroethylene, highly soluble in methanol, ethanol, n-butanol, acetone, methylethyl ketone, methylene chloride and chloroform, and less highly soluble in diethyl ether and benzene.

*Example 3*

The preparation of N-1,1-dihydroperfluorooctyl-N'-isopropylene urea

was carried out as in Example 1 by dissolving 6.7 parts of C-methyl ethylenimine, which is obtainable analogously to the preparation of ethylenimine itself, for example according to Ullmanns Encyklopadie der Technischer Chemie, Urban and Schwarzenberg, Munich-Berlin, 1953, 3rd Ed., p. 462, from the corresponding alcohol amine in 75% yield, in 60 parts by volume of absolute ether and then slowly added drop-wise to a solution of 50 parts by weight of 1,1-dihydroperfluorooctyl isocyanate in 300 parts by volume of absolute ether. The product is obtained in very good yield. Recrystallization from 1:1 ether; methylethyl ketone yields a substance melting at 68° C.

Analytical data for $C_{12}H_9F_{15}N_2O$. — Calculated: 29.88% C, 1.88% H, 5.81% N. Found: 30.26% C, 2.04% H, 6.13 N.

The solubilities correspond essentially to those of the products described in Examples 1 and 2.

*Example 4*

N-1,1-dihydroperfluorobutyl-N'-isopropylene urea with a melting point of 46° C. can be prepared as in Example 1 by reaction of 1,1-dihydroperfluorobutyl isocyanate with isopropylenimine in weakly alkaline water with cooling.

A reaction with pentylenimine takes place in a similar manner. The solubility of the N-1,1-dihydroperfluorobutyl-N'-pentylene urea corresponds approximately to those of the products which are given in the preceding examples.

*Example 5*

As was illustrated in the preceding example, in the preparation of N - 1,1,11 - trihydroperfluoroundecyl-N'-ethylene urea

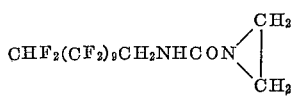

4 parts by weight of ethylenimine dissolved in 50 parts by volume of methylene chloride can be added dropwise to a solution of 50 parts by weight of 1,1,11-trihydroperfluoroundecyl isocyanate in 250 parts by volume of methylene chloride. In this manner the N-1,1,11-trihydroperfluoroundecyl urea is obtained after the usual work-up.

*Example 6*

If the product obtained in Example 1 from 1,1-dihydroperfluorooctyl isocyanate and ethylenimine is carefully heated to 110° to 120° C. by itself or in a suitable solvent, then an exothermic reaction again takes place with the formation of a polymeric product. This reaction is intensified by excess ethylenimine and it must be assured by cooling that the temperature does not exceed 135° to 140° C., since otherwise the resulting product is dark in color. The excess of ethylenimine can rise to about 2.5 mols per mol of isocyanate. A polymeric product is also obtained when polymeric ethylenimine is used in the reaction.

After the reaction dies down it is stirred cold, and after removal of any solvent, a yellow more-or-less brittle resin forms. It is insoluble in hydrocarbons, chlorinated hydrocarbons and ethers and only of limited solubility in alcohols, such as isopropanol, shows better solubility in ketones such as methylethyl ketone, and is highly soluble in concentrated lower organic acids such as formic acid or glacial acetic acid. Opalescent liquids result on dilution of these acid solutions with water.

What is claimed is:
1. N-1,1-dihydrofluoroalkyl-N'-alkylene urea.
2. N-1,1-dihydroperfluorooctyl-N'-ethylene urea.
3. N-1,1-dihydroperfluorobutyl-N'-ethylene urea.
4. N-1,1-dihydroperfluorooctyl-N'-isopropylene urea.
5. N-1,1-dihydroperfluorobutyl-N'-isopropylene urea.
6. N - 1,1,11 - trihydroperfluoroundecyl-N'-ethylene urea.

References Cited by the Examiner

UNITED STATES PATENTS

| | | | |
|---|---|---|---|
| 2,314,968 | 3/1943 | Beastian et al. | 260—77.5 |
| 2,360,192 | 10/1944 | Beastian et al. | 260—77.5 |
| 2,706,733 | 4/1955 | Reid | 260—77.5 |

OTHER REFERENCES

Methoden der Organischen Chemie-Stickstoff Verbindungen II/III, p. 241, 1958.

Ser. No. 387,060, Beastian et al. (A.P.C.), published April 1943.

LEON J. BERCOVITZ, *Primary Examiner.*

MARK C. JACOBS, *Examiner.*